US007493625B2

(12) United States Patent
Peipelman et al.

(10) Patent No.: US 7,493,625 B2
(45) Date of Patent: *Feb. 17, 2009

(54) HIERARCHICAL EVENT FILTERING FOR MULTIPLE PARENT EVENT TYPES

(75) Inventors: Jason L. Peipelman, Tucson, AZ (US); Glenn P. Williamson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 709 days.

This patent is subject to a terminal disclaimer.

(21) Appl. No.: 10/869,223

(22) Filed: Jun. 16, 2004

(65) Prior Publication Data

US 2005/0193395 A1 Sep. 1, 2005

Related U.S. Application Data

(63) Continuation-in-part of application No. 10/789,167, filed on Feb. 27, 2004.

(51) Int. Cl.
*G06F 13/00* (2006.01)

(52) U.S. Cl. ...................................................... 719/318

(58) Field of Classification Search .................. 719/318
See application file for complete search history.

(56) References Cited

U.S. PATENT DOCUMENTS

| | | | | |
|---|---|---|---|---|
| 6,182,086 | B1 * | 1/2001 | Lomet et al. | 707/202 |
| 6,438,618 | B1 * | 8/2002 | Lortz et al. | 719/318 |
| 6,993,771 | B1 * | 1/2006 | Hasha et al. | 719/318 |
| 7,000,150 | B1 * | 2/2006 | Zunino et al. | 714/38 |
| 2002/0099795 | A1 * | 7/2002 | Betros et al. | 709/219 |

* cited by examiner

*Primary Examiner*—Andy Ho
(74) *Attorney, Agent, or Firm*—Scully, Scott, Murphy & Presser, P.C.

(57) ABSTRACT

A technique for reducing the number of events that are transmitted by a server to a client/server application programming interface (API). At the server host, each of different event messages is associated with at least one event category in a hierarchy of event categories. Each client host sends a registration request to the server host in order to inform the host server host that the client wants to receive event messages associated with a specified event category. The server host associates the specified event category with each client host and communicates the event messages that are descendants of the specified event category, wherein the event messages may be descendants of more than one specified event category.

8 Claims, 4 Drawing Sheets

400 SERVER HOST GENERATES EVENT? NO YES

410 SERVER HOST COMPARES NODE OF GENERATED EVENT WITH NODE FOR WHICH THE CLIENT REGISTERED

420 GENERATED EVENT IS A DESCENDANT OF THE EVENT CATEGORY FOR WHICH THE CLIENT REGISTERED? NO YES

430 TRANSMIT EVENT MESSAGE TO CLIENT HOST

440 NEXT CLIENT HOST? YES NO

HIERARCHICAL EVENT FILTERING FOR MULTIPLE PARENT EVENT TYPES

This application is a continuation-in-part and claims the benefit of priority of U.S. application Ser. No. 10/789,167 filed Feb. 27, 2004, the entirety of which is incorporated herein by reference.

BACKGROUND OF THE INVENTION

1. Field of the Invention

The invention relates generally to the field of computer systems and, more specifically, to a technique for reducing the number of events that are transmitted by a server host, e.g., in a client/server application programming interface (API).

2. Description of the Related Art

Computer systems include host computers that communicate with one another via a network to run network applications. Typically, software is distributed and run on two or more hosts to realize the applications. The network applications have application-layer protocols that define the format and order of the messages that are exchanged between the hosts, and what actions to take when a message is transmitted or received. In particular, a network application typically includes a client side and a server side. In this case, the application may be referred to as a client/server application. A client side on one host may communicate with a server side on another host. The client is usually the host that initiates a communication or session with another host.

Moreover, in a client/server application programming interface (API), the server generates events and transmits them over a network to the client. The API includes a portion run on the server and a corresponding portion run on the client. An event generally refers to an occurrence of significance to a task, such as the opening of a window or the completion of an asynchronous operation. An event may involve any significant change in the state of a system resource, network resource, or network application. An event can be generated, e.g., for a problem, for the resolution of a problem, or for the successful completion of a task. Examples of events include the normal starting and stopping of a process, the abnormal termination of a process, and the malfunctioning of a server. For instance, a storage system such as a storage server may run software that generates and communicates such events to clients that store data on the server. The IBM® Enterprise Storage Server (ESS) is an example of such a storage system.

However, performance can be reduced when many events are transmitted due to the use of processing, storage and transmission resources.

BRIEF SUMMARY OF THE INVENTION

To overcome these and other deficiencies in the prior art, the present invention provides a technique for reducing the number of events that are transmitted by a server in a client-server API. To achieve this, an end application running at the client is allowed to register for only those events that it requires, and not all events that are generated by the server.

In a particular aspect of the invention, a method is provided for use at a server host in controlling the communication of different event messages to at least one client host. The method includes associating each of the different event messages with at least one event category in a hierarchy of event categories, associating a particular one of the event categories with the at least one client host, and communicating a particular one of the different event messages to the at least one client host when the particular one of the different event messages is a descendant of the particular one of the event categories.

In another aspect of the invention, a method is provided for use at a client host in controlling the communication of different event messages thereto from a server host. The method includes communicating a registration request to the server host, wherein, at the server host, each of the different event messages is associated with at least one event category in a hierarchy of event categories, the registration request indicating a particular one of the different event categories to be associated with the client host, and responsive to the communicating, receiving event messages from the server host that are descendants of the particular one of the different event categories.

In a further aspect of the present invention a method is provided for use at a server host in controlling the communication of different event messages to at least one client host. The method includes associating each of the different event messages with at least one event category in a hierarchy of event categories, associating descendants of the different event messages with a plurality of event categories, associating an event category with the at least one client host and communicating a different event message and its descendants to the at least one client host when the different event message is a descendant of the event category.

In a yet further aspect of the present invention a method is provided for use at a client host in controlling the communication of different messages thereto from a server host. The method provides communicating a registration request to the server host, wherein, at the server host, each of the different event messages is associated with at least one event category in a hierarchy of event categories and descendants of the different event messages are associated with a plurality of event categories. The registration request indicates a particular one of the different event categories to be associated with the client host and responsive to the communicating, receiving event messages from the server host that are descendants of the particular one of the different event categories.

A related apparatus and program storage device are also provided.

BRIEF DESCRIPTION OF THE DRAWINGS

These and other features, benefits and advantages of the present invention will become apparent by reference to the following text and figures, with like reference numbers referring to like structures across the views, wherein.

DETAILED DESCRIPTION OF THE INVENTION

Figure 1:
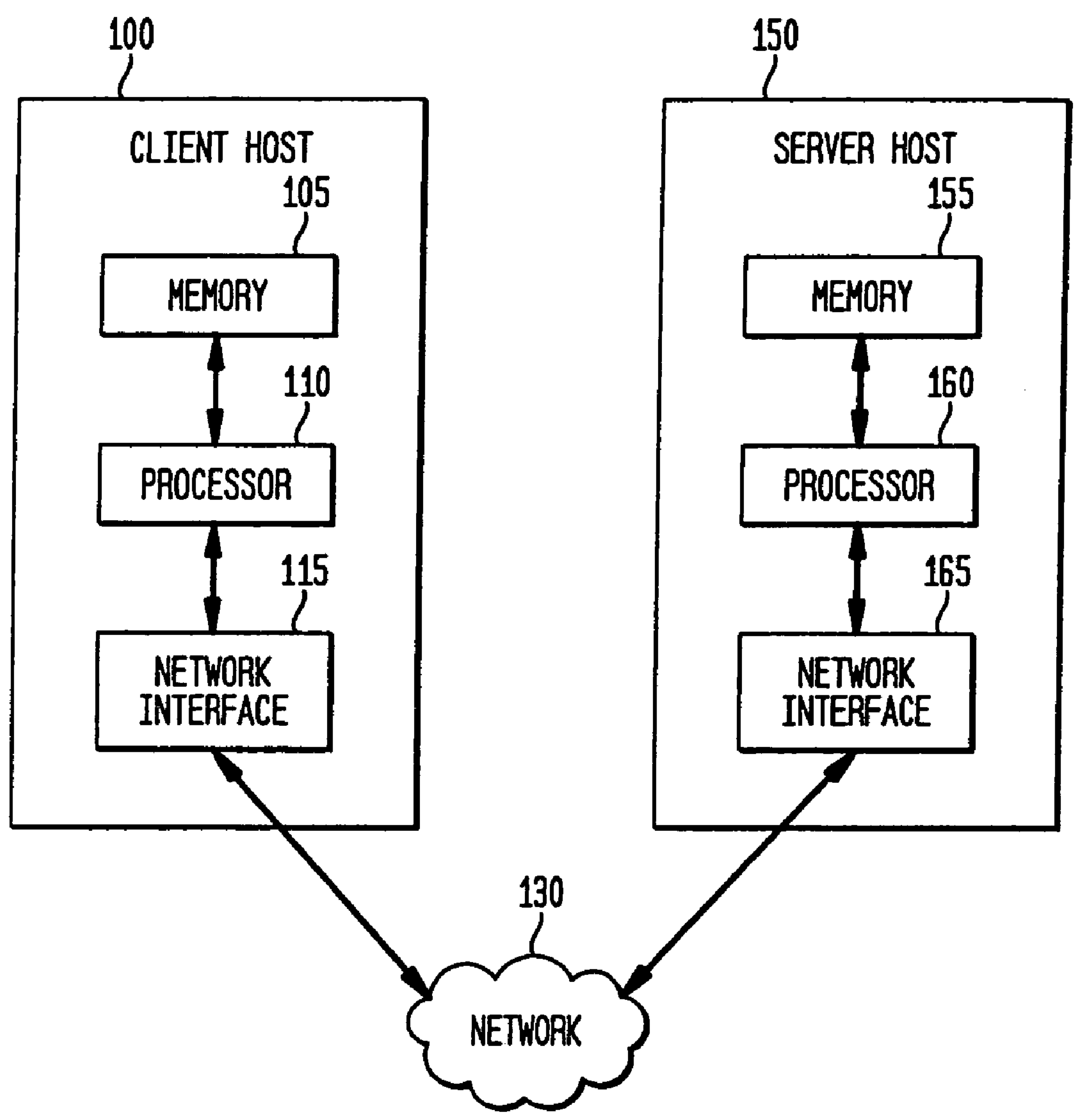
FIG. 1 illustrates a client-side host and a server-side host in a computer system.

FIG. 1 illustrates a client-side host 100 and a server-side host 150 in a computer system. The client host 100 includes a processor 110, memory 105 and network interface 115, while the server host 150 similarly includes a processor 160, memory 155 and network interface 165. The network interfaces 115 and 165 communicate with one another via a network 130 such as the Internet. The client-side host 100 may implement a client-side API that comprises a client-side of a command-based API, while the server-side host 150 may implement a server-side API that comprises a server-side of the command-based API. In a command-based API, one or more hosts send commands to one or more other hosts. For example, a command-based API may be used by a storage subsystem host and remote hosts that send data to the storage subsystem host to be backed up. The remote hosts may issue commands to the storage subsystem host to instruct it to backup their data, or to retrieve previously backed up data, for instance.

The general operation and configuration of the processors 110, 160, memories 105, 155 and network interfaces 115, 165 is well known in the art and is therefore not described in detail. The components illustrated are provided to assist in understanding the invention. The hosts 100, 150 may be general-purpose computers, workstations, servers, portable devices such as PDAs, or other computer devices. The functionality described herein can be achieved by configuring the hosts 100 and 150 with appropriate software. In one approach, the software comprises an object-oriented software such as Java code that is stored in the memories 105, 155. Any type of programming language may be used. In one approach, the memories 105, 155 are program storage devices that store executable software instructions for execution by the processors 110, 160 in a known manner.

As indicated, the present invention provides a technique for reducing the number of events that are transmitted from the server host 150 to one or more client hosts 100 in a client-server API. This invention solves the problem by maintaining an event category hierarchy and allowing the end application to register at any point in the hierarchy. When registering for events of a particular event category in the hierarchy, the effect is the same as registering for all events at that level down. In other words, the clients register for all the leaf or descendant events of a specified event category. In one approach, only the leaf nodes of the hierarchy, which are the lowest level nodes, match to real events that can be generated. The invention addresses both event registration and event distribution. The various events that may be generated may be arranged in a hierarchy according to various approaches. In one possible approach, an object-oriented hierarchy is used. This approach can be illustrated conceptually by the following example.

Figure 2:
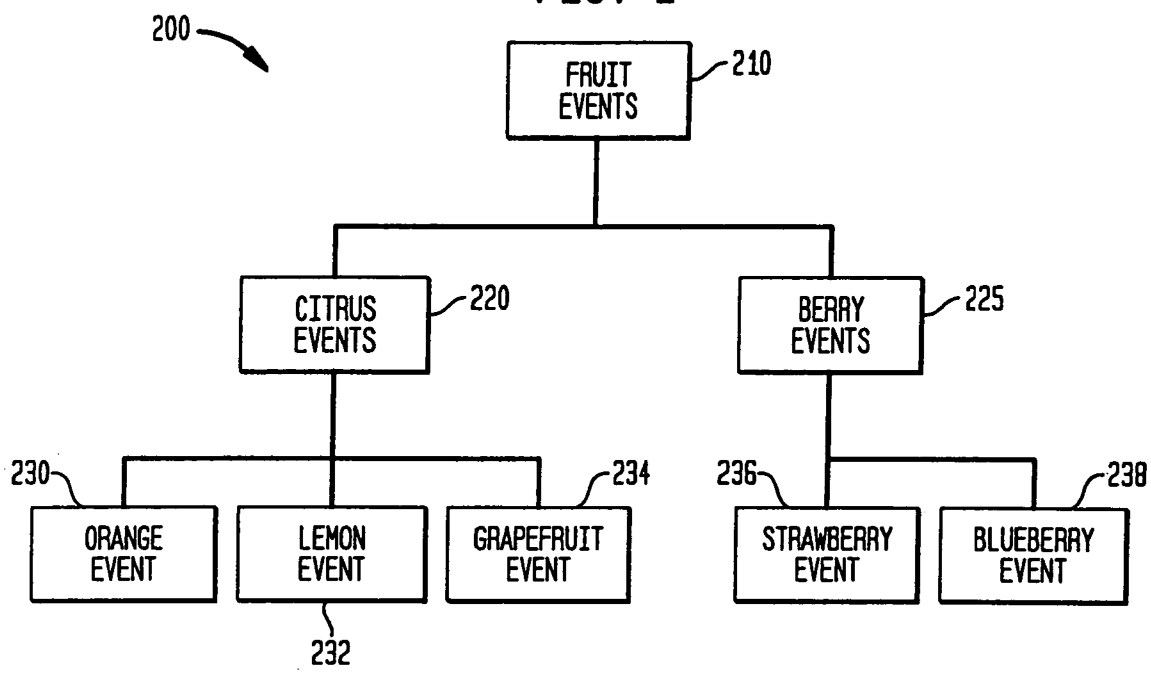
FIG. 2 illustrates a hierarchy of events and event categories.

FIG. 2 illustrates a hierarchy of events and event categories. This example uses fruit types as an illustration. In practice, actual events that are generated, and event categories that are defined, can be arranged accordingly. The tree 200 includes a node for Fruit Events 210 at a top level or hierarchy of the tree. Citrus Events 220 and Berry Events 225 are subcategories of Fruit Events. The nodes for Citrus Events 220 and Berry Events 225 are leaf or descendant nodes of the node for Fruit Events 210. Nodes for an Orange Event 230, Lemon Event 232 and Grapefruit Event 234 are subcategories or descendant nodes of Citrus Events and Fruit Events 210, as well as being descendants of the Fruit Events 210. Nodes for a Strawberry Event 236 and a Blueberry Event 238 are descendant nodes of the node for Berry Events 225, as well as being descendants of the Fruit Events 210. The Fruit Events 210, Citrus Events 220 and Berry Events 225 are event categories, while the Orange Event 230, Lemon Event 232, Grapefruit Event 234, Strawberry Event 236 and Blueberry Event 238 are actual events that can be generated.

For example, a client that has registered for the Orange Event 230 would only get Orange events and not Lemon Events. In this case, the client receives the event message for which the client registered. A client that has registered for the category of Citrus Events 220 would receive the Orange Event 230, Lemon Event 232, and the Grapefruit Event 234, but would not receive the Strawberry Event 236 or the Blueberry Event 238. A client that has registered for the category of Fruit Events 210 would receive the Orange, Lemon, Grapefruit, Strawberry and Blueberry events. In these cases, the client receives event messages for nodes that are descendants of the particular node or event category that is associated with the client. The hierarchy can have one or more levels of event categories.

In another possibility, the event hierarchy represents an importance or priority hierarchy. For example:

All events at a top level;

Subcategories of All events would be high, medium, and low importance;

High has subcategories X, Y, Z;

Medium has subcategories A, B, C; and

Low has subcategories 1, 2, 3.

Figure 3:
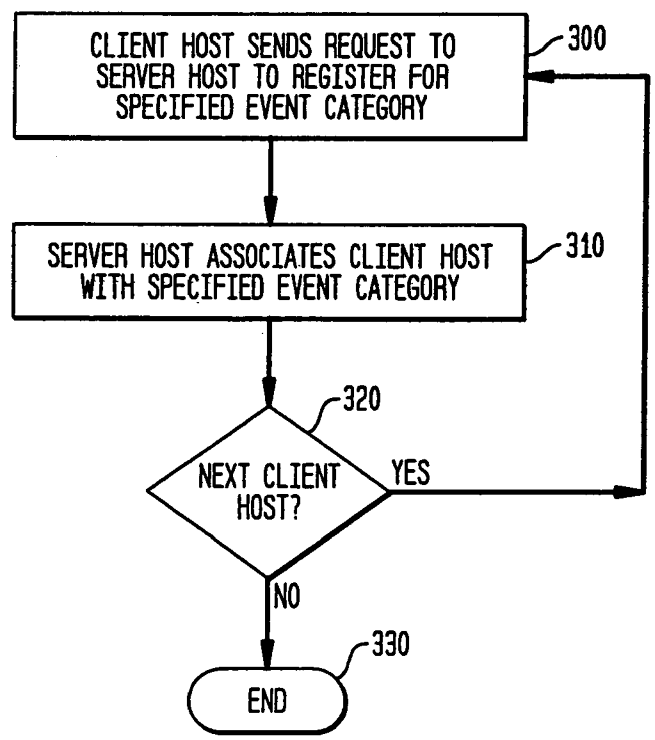
FIG. 3 illustrates a method for providing event registration.

FIG. 3 illustrates a method for providing event registration. At block 300, the client host sends a request to the server host to register for a specified event category. For example, there may be five levels of events identified by the number one through five. If a client host registers at a particular level in the hierarchy that is associated with a particular node, then all events of types listed in the branch below that node that are generated will be communicated to the client host. Thus, events in different branches or higher branches of event categories are not provided to the client host. The end application at the client host registers with the server host for a type of event, or event category, that exists in the hierarchy. The registration request is transmitted from the client host to the server host. At block 310, the server host associates the client host with the specified event category. At block 320, the process of blocks 300 and 310 is repeated for additional client hosts and/or applications. The process ends at block 330.

Figure 4:
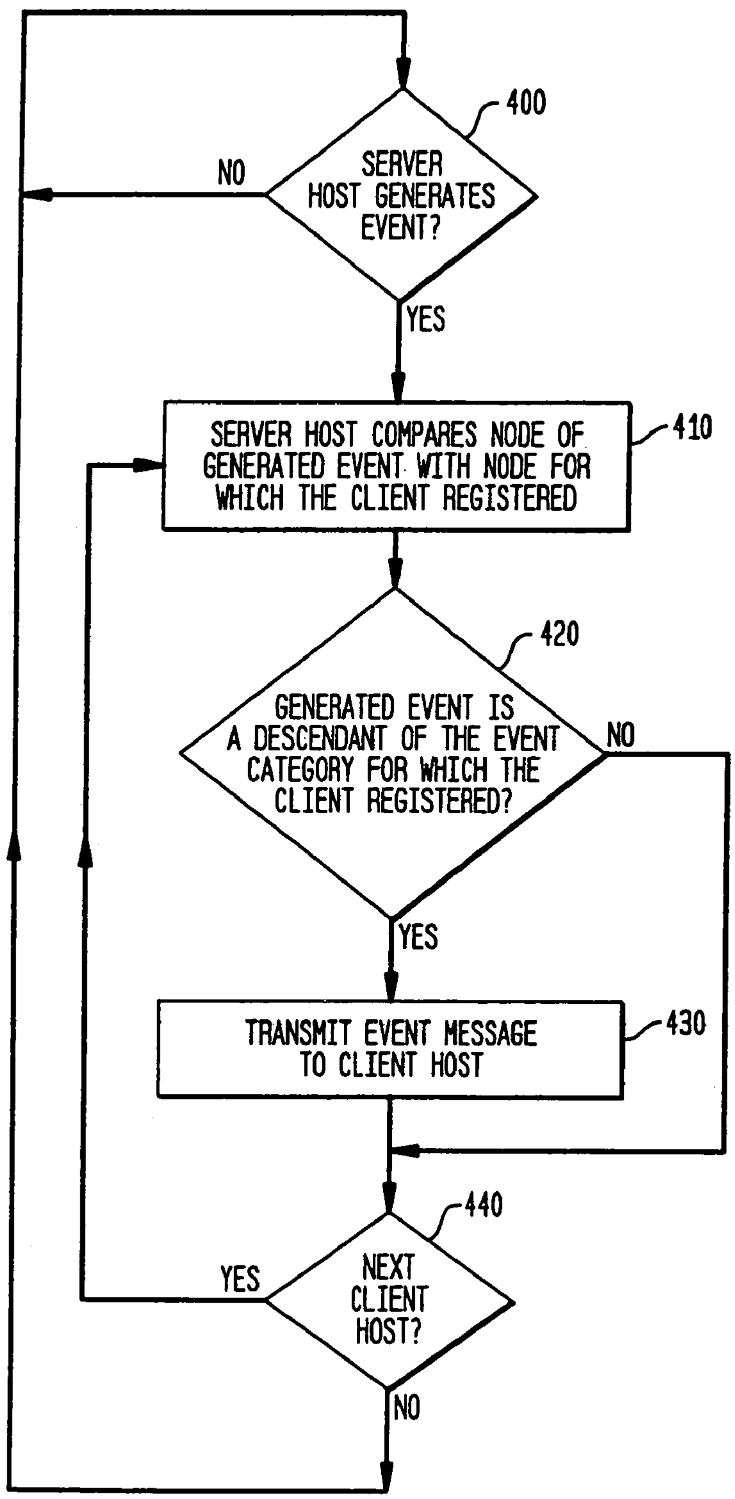
FIG. 4 illustrates a method for performing event distribution.

FIG. 4 illustrates a method for performing event distribution. At block 400, when the server host generates an event, it compares the hierarchical level or node of the generated event with the hierarchical level or node of the event category that has been associated with the client host (block 410), e.g., the event category for which the client registered. If the node for the generated event is the same as, or is a descendant node of, the event category for which the client host registered (block 420), the server host transmits the event message to the client host or application (block 430). Otherwise, the event message is not transmitted to the client host. At block 440, the process of blocks 410, 420 and 430 may be repeated if there are additional client hosts and/or applications. In summary, with event distribution, the server generates an event of a given type or category. For each client, the server determines if the client is associated with that event category or any higher-level event category in the hierarchy. If an association is found, the event is transmitted to the client. Otherwise, the event is not transmitted.

Figure 5:
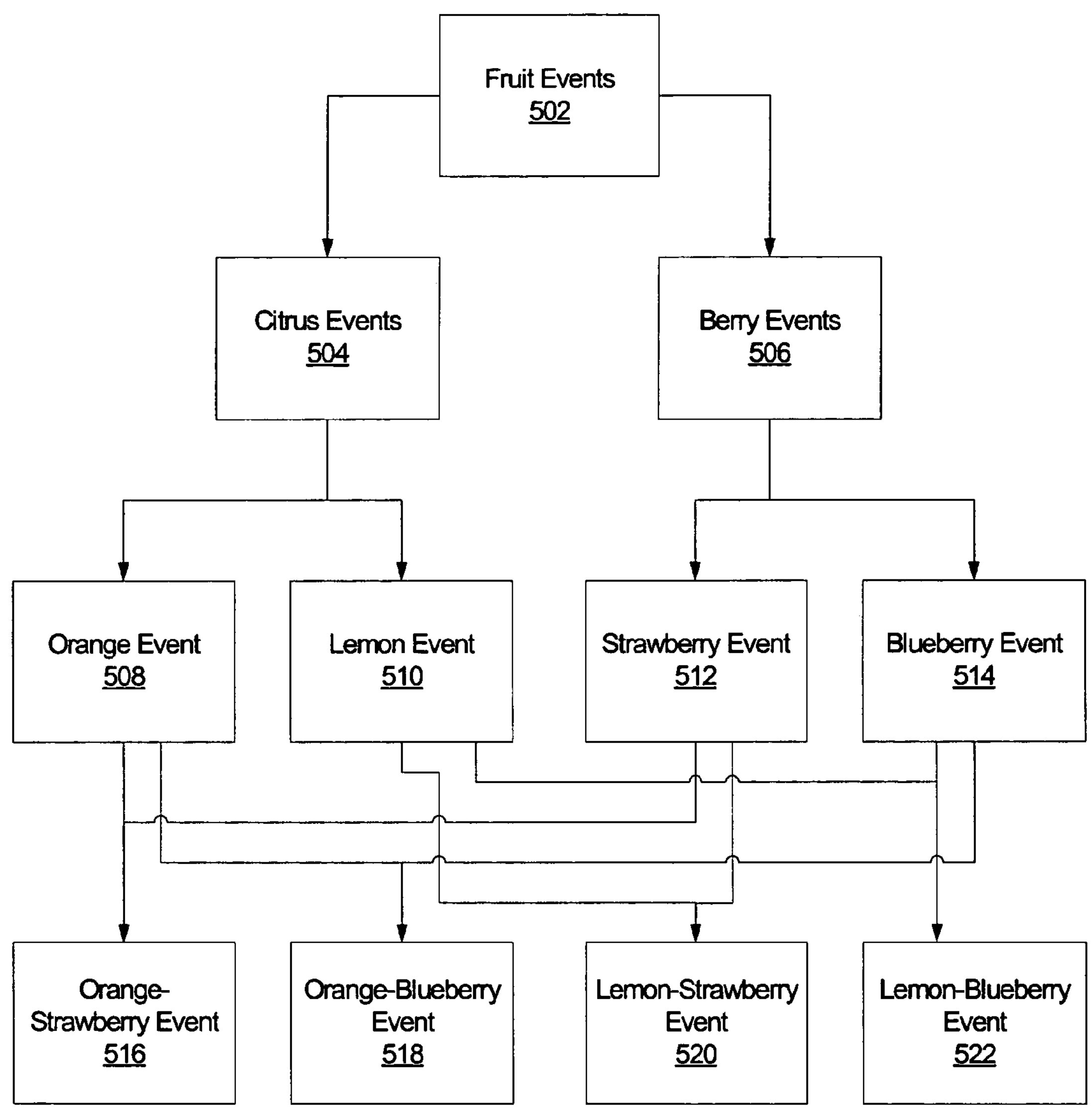
FIG. 5 illustrates a method for performing event distribution for multiple parent event types.

FIG. 5 illustrates a further aspect of the present invention, wherein a client can register for an event that extends more than one event category. As used above, fruit types are used as an illustration. As also mentioned above, actual generated events and defined event categories can be arranged accordingly. The tree 500 includes the node for Fruit Events at the top level or hierarchy of the tree. As illustrated in FIG. 2, Citrus Events 504 and Berry Events 506 are subcategories of Fruit Events 500.

The nodes for Citrus Events 504 and Berry Events 506 are leaf or descendant nodes of the node for Fruit Events 502. The nodes for Orange Event 508 and Lemon Event 510 are subcategories or descendant nodes of Citrus Events 504 and Fruit Event 502. The nodes for Strawberry Event 512 and Blueberry Event 514 are subcategories or descendant nodes of Berry Event 506 and Fruit Event 502.

The Fruit Events 502, Citrus Events 504 and Berry Events 506 are event categories whereas the Orange Event 508, Lemon Event 510, Strawberry Event 512, Blueberry Event 514, Orange-Strawberry Event 516, Orange-Blueberry Event 518, Lemon-Strawberry Event 520 and the Lemon-Blueberry Event 522 are actual events that can be generated. A client that registers individually for the Orange-Strawberry Event 516, Orange-Blueberry Event 518, Lemon-Strawberry Event 520 and the Lemon-Blueberry Event 522 will only be registered for the particular chosen event.

However, in this instance, a client that registers for the Orange Event 508 will also be registered for Orange-Strawberry Event 516 and Orange-Blueberry Event 518, wherein the Orange-Strawberry Event 516 and Orange-Blueberry Events 518 are the descendants of both the categories Citrus Events 504 and Berry Events 514. Therefore, a client may register for an event that is the descendant of more than one event category. This registration procedure is also extended to the events for Lemon Event 510, Strawberry Event 512 and Blueberry Event 514, wherein if selected by a client then all descendants of these events are additionally registered.

Further, a client that has registered for the category of Citrus Events 504 would be registered with the Orange Event 508, the Lemon Event 510 and the Orange-Strawberry Event 516, the Orange-Blueberry Event 518, the Lemon-Strawberry Event 520 and the Lemon-Blueberry Event 522. Accordingly, a client that has registered for the category Fruit Events 502 will be registered for Citrus Events 504, Berry Events 506, Orange Event 508, Lemon Event 510, Strawberry Event 512, Blueberry Event 514, Orange-Strawberry Event 516, Orange-Blueberry Event 518, Lemon-Strawberry Event 520 and Lemon-Blueberry Event 522.

In the above-described instances, client receives event messages for nodes that are descendants of the particular node or event category that is associated with the client in addition to descendants of nodes or event categories that are not associated with the client. The hierarchy can have one or more levels of event categories and events.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed:

1. A method for the use at a server host in controlling the communication of different event messages to at least one client host, comprising:

associating each of the different event messages with at least one event category in a hierarchy of event categories;

associating descendants of the different event messages with a plurality of event categories;

associating an event category with the at least one client host;

at said at least one client host, registering for an event that is a descendant of more than one event categories, wherein said more than one event categories are in a same hierarchical level; and communicating a different event message and its descendants to the at least one client host when the different event message is a descendant of the event category.

2. The method of claim 1, further including the step of communicating the descendant of the different event message to the at least one client host when the descendant of the different event message is a descendant of the event category.

3. The method of claim 2, wherein the step of associating the event category with the at least one client host further comprises associating the event category with an application at the at least one client host.

4. The method of claim 3, wherein different event messages are provided by an application programming interface.

5. The method of claim 4, wherein the hierarchy of event categories includes at least one level.

6. A method for use at a client host in controlling the communication of different messages thereto from a server host, comprising:

communicating a registration request to the server host;

wherein, at the server host, each of the different event messages is associated with at least one event category in a hierarchy of event categories and descendants of the different event messages are associated with a plurality of event categories;

the registration request indicating a particular one of the different event categories to be associated with the client host;

responsive to the communicating, receiving event messages from the server host that are descendants of the particular one of the different event categories; and receiving event messages that are descendants of event categories that are not associated with the client host.

7. The method of claim 6, wherein the registration request is communicated to the server host by an application at the client host.

8. The method of claim 7, wherein the hierarchy of event categories includes at least one level.

* * * * *